United States Patent
Irokawa et al.

(12)

(10) Patent No.: US 6,279,374 B1
(45) Date of Patent: Aug. 28, 2001

(54) COMPENSATING METHOD AND COMPENSATING APPARATUS FOR POSITIONER

(75) Inventors: Kenji Irokawa, Ibaraki-ken; Yasushi Watanabe, Toride, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/286,905

(22) Filed: Apr. 6, 1999

(30) Foreign Application Priority Data

Apr. 13, 1998 (JP) .................................................. 10-101610

(51) Int. Cl.[7] .................................................. G01C 17/38
(52) U.S. Cl. ............................................................ 73/1.79
(58) Field of Search .................................... 73/1.79, 1.81; 324/699, 716, 721, 720; 702/97

(56) References Cited

U.S. PATENT DOCUMENTS

| | | | |
|---|---|---|---|
| 5,502,999 | 4/1996 | Seberger et al. | ......................... 73/4 R |
| 5,804,696 | 9/1998 | Seberger et al. | ....................... 73/1.59 |

FOREIGN PATENT DOCUMENTS 6-207601    7/1994 (JP).

*Primary Examiner*—Robert Raevis
(74) *Attorney, Agent, or Firm*—Paul A. Guss

(57) ABSTRACT

A compensating method for a positioner is provided, which makes it possible to avoid any temperature-compensating circuit and any linearity-compensating circuit for a position sensor, and reduce the production cost. The position sensor, which detects the displacement amount of a movable section of an objective control device operated on the basis of a control signal outputted from the positioner, provides an output which is subjected to the temperature compensation calculation by using a linear expression including a slope and an intercept determined on the basis of a temperature measured by a temperature sensor to obtain a temperature-compensated output data. The temperature-compensated output data is subjected to the linearity compensation calculation for compensating the nonlinearity of the position sensor by using a linear expression including a slope and an intercept determined on the basis of the temperature-compensated output data to obtain a linearity-compensated output data for which the nonlinearity has been compensated. An actuator is operated and controlled on the basis of the linearity-compensated output data.

7 Claims, 8 Drawing Sheets

COMPENSATING METHOD AND COMPENSATING APPARATUS FOR POSITIONER

BACKGROUND OF THE INVENTION

1. Field of the Invention

The present invention relates to a compensating method and a compensating apparatus for a positioner, which make it possible to correct the temperature characteristic and the nonlinearity of a position sensor and obtain an output involving few errors.

2. Description of the Related Art

A positioner has been hitherto used to control a pressure fluid-driven apparatus such as a diaphragm motor and a cylinder. Such a positioner controls the pressure fluid on the basis of a difference signal between an input signal as a control command signal given, for example, as an electric signal, a pneumatic pressure signal or the like, and an output signal of a position sensor for detecting, for example, the displacement of an output shaft of a diaphragm motor or the position of displacement of a piston of a cylinder so that the output shaft, the piston or other components may be displaced to an angle or a position based on the control command signal. In the case of such a positioner, for example, when an MR element (magneto resistive effective element) is used for the position sensor, the service live of the position sensor is prolonged, because there is no sliding section. Further, it is possible to make highly accurate control, because there is no noise in output signal, and the resolution is enhanced.

However, the output signal of the position sensor such as the MR element greatly depends on the environmental temperature, and it has a nonlinear output characteristic with respect to, for example, the position of the output shaft of the diaphragm and the displacement position of the piston. Therefore, it is necessary to use a temperature-compensating circuit and a linearity-compensating circuit.

As a result, a problem arises in that the production cost of the positioner is expensive.

Further, "Electro-pneumatic converter calibration method" is disclosed in Japanese Laid-Open Patent Publication No. 6-207601. The method comprises the steps of calibration; a calibration sequence in which correction values for electrical signal inputs are obtained for a plurality of set temperatures and stored in a memory; a compensation sequence in which an active correction value is determined for a particular electrical signal input against the measured temperature and stored in the memory; and an operation sequence wherein the active correction value is read from the memory and applied to the electrical signal input to provide a corrected input signal for operating the electro-pneumatic converter device. Linearization method includes the steps of adjusting the positioner feedback linkage until a predetermined reference position is attained, reading a position feedback value from a feedback position sensor, and determining a position feedback linearization reference value by varying the positioner electrical signal input to match the positioner feedback linkage non-linearity, and storing the reference value in the memory.

In the above-mentioned method, however, compensation values over respective points for all the temperatures and all the positioner inputs should be stored in a memory, so that the number of data tends to extremely large. As a result, a problem arises in that a memory having mass storage is necessary.

SUMMARY OF THE INVENTION

The present invention has been made in order to solve the problem described above, an object of which is to provide a compensating method and a compensating apparatus for a positioner, which make it possible to avoid any temperature-compensating circuit and any linearity-compensating circuit of a position sensor, and reduce the production cost by saving storage capacity of a memory.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The compensating method and the compensating apparatus for the positioner according to the present invention will be explained in detail below with reference to the accompanying drawings, as exemplified by a preferred embodiment.

Figure 1:
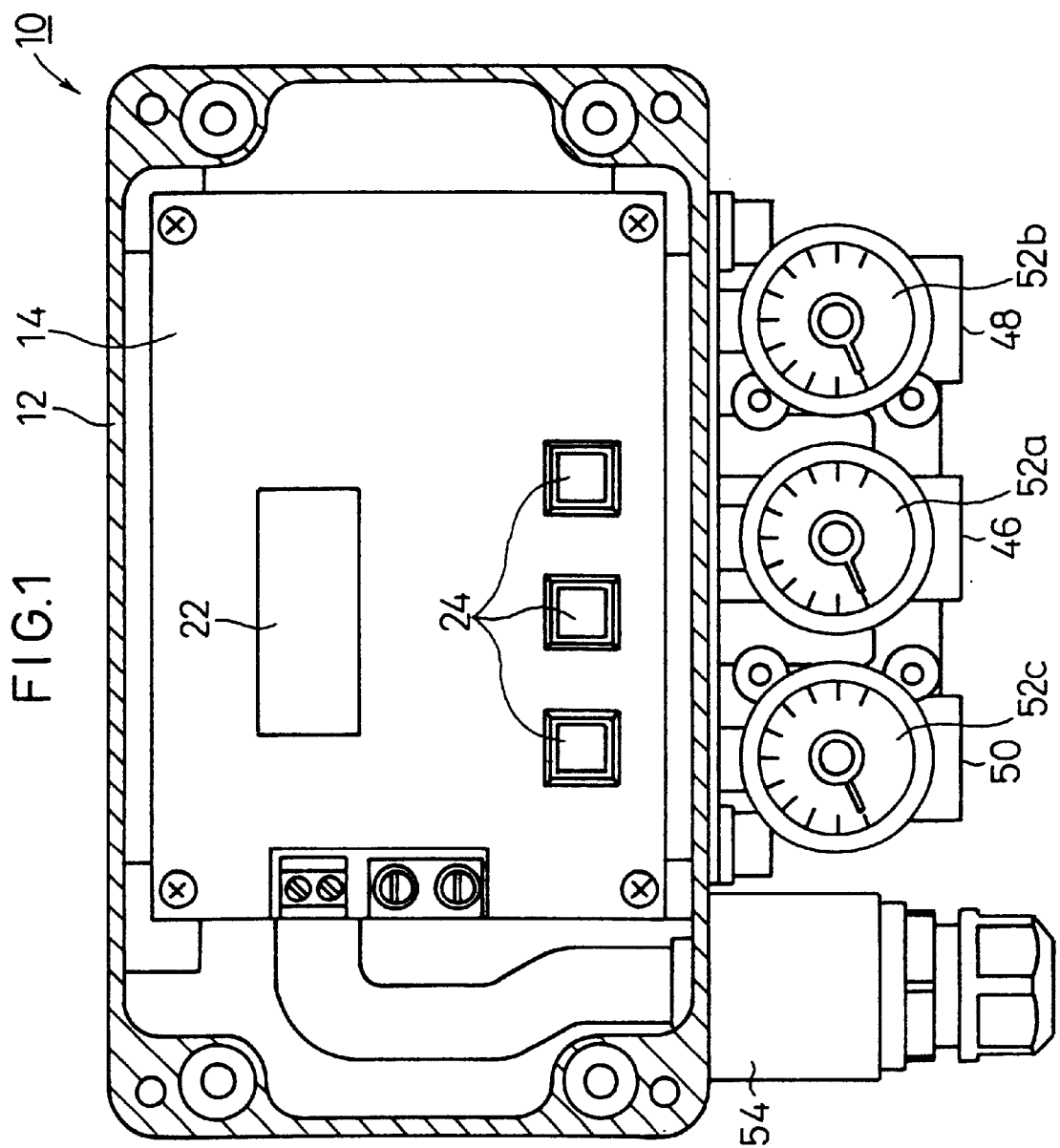
FIG. 1 shows a cross-sectional view illustrating a positioner to be used for a compensating method according to an embodiment of the present invention.
Figure 2:
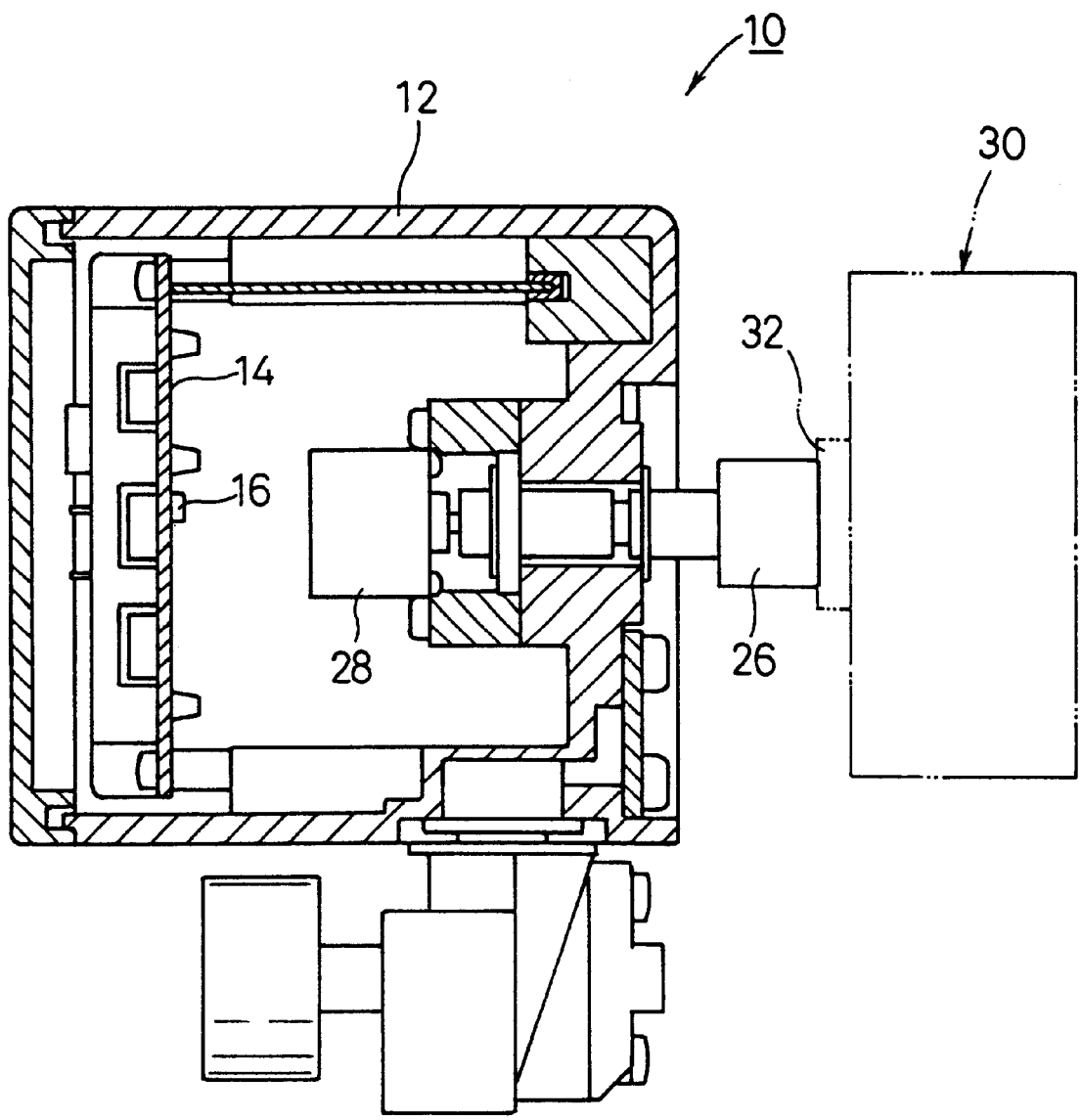
FIG. 2 shows a longitudinal sectional view illustrating the positioner shown in FIG. 1.
Figure 5:
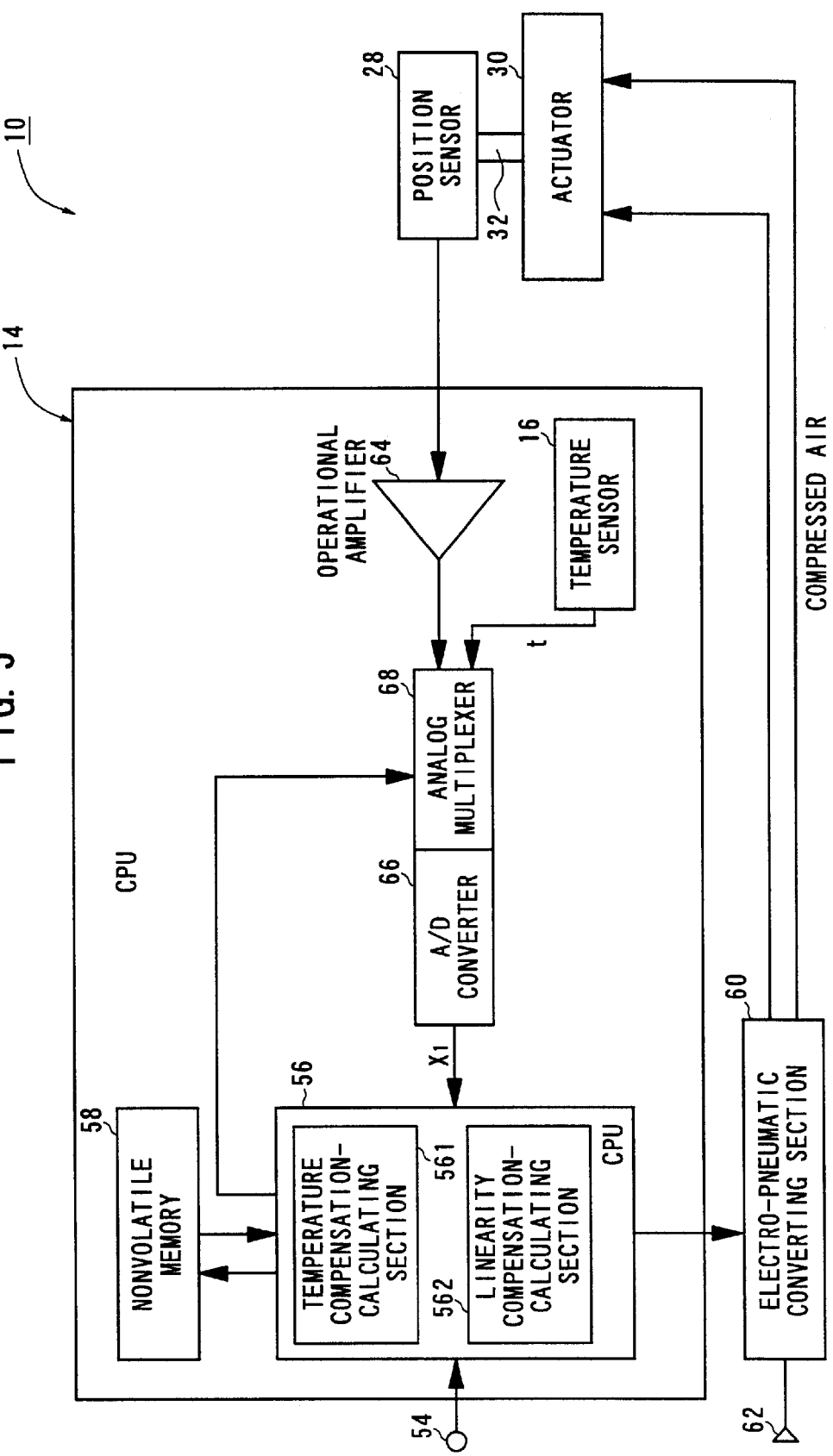
FIG. 5 shows a block diagram illustrating the positioner shown in FIG. 1.

With reference to FIGS. 1 and 2, reference numeral 10 indicates a positioner to be used for the compensating method according to the embodiment of the present invention. This embodiment is illustrative of a case in which the pressure fluid-driven apparatus (an objective control device) is a cylinder, and a piston of the cylinder is operated (in FIG. 5, shown as "ACTUATOR"). The positioner 10 comprises a casing 12. A printed circuit board 14 is arranged at the inside of the casing 12. A temperature sensor 16, a display unit 22, a plurality of switches 24, and other components are disposed on the printed circuit board 14. A feedback shaft 26 is rotatably supported on the casing 12. A position sensor 28 is coupled to one end of the feedback shaft 26. A rotary shaft 32 of an actuator 30 (hereinafter referred to as the rotary shaft of the actuator 30 as well), which is controlled by the positioner 10 and which corresponds to an output shaft operated by converting the displacement of an output shaft of the actuator 30 into the rotation, is coupled to the other end of the feedback shaft 26. The angle of rotation of the rotary shaft 32 is obtained by converting the displacement of the output shaft of the actuator 30 into the rotation.

Figure 3:
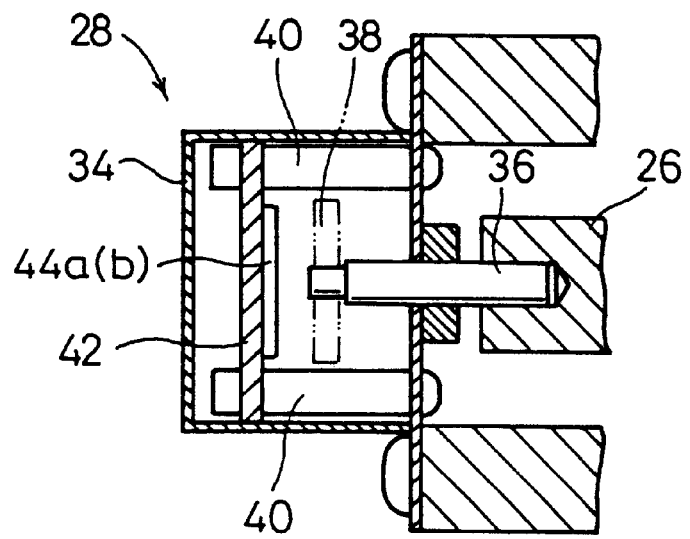
FIG. 3 shows a longitudinal sectional view illustrating a position sensor to be used for the positioner shown in FIG. 1.
Figure 4:
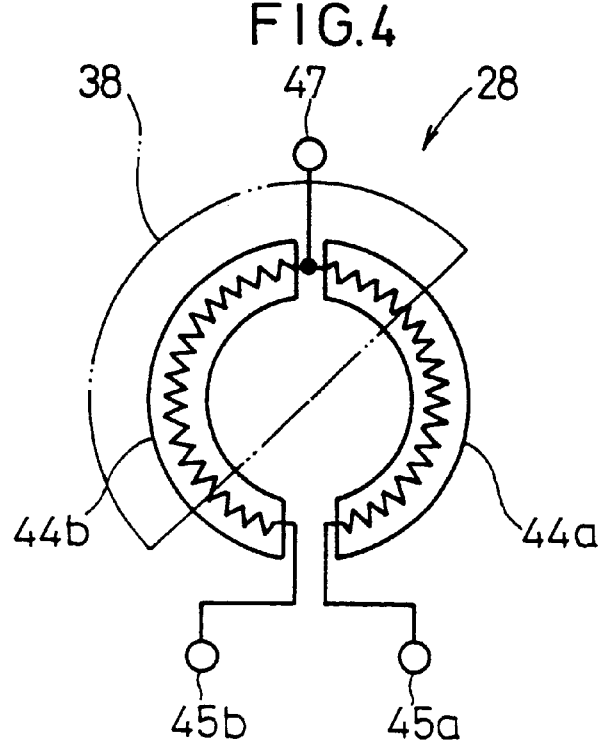
FIG. 4 shows a circuit diagram illustrating the position sensor shown in FIG. 3.

As shown in FIG. 3, the position sensor 28 includes a casing 34. A sensor shaft 36, which is coupled to the feedback shaft 26, is rotatably inserted through the casing 34. A magnet 38 having a substantially semicircular cross section is secured to one end of the sensor shaft 36. A substrate 42 is fixed at the inside of the casing 34 by the aid of a stud 40. MR elements 44a, 44b, which are opposed to the magnet 38, are secured to the substrate 42. As shown in FIG. 4, each of the MR elements 44a, 44b is formed to have a semicircular arc-shaped configuration, and each of them is arranged about the center of the axis of the sensor shaft 36. First terminals of the MR elements 44a, 44b are formed as input terminals 45a, 45b. Second terminals thereof are connected to one another to form an output terminal 47 which is connected to a so-called potentiometer.

The casing 12 is formed with a supply passage 46 for introducing therein the compressed air outputted from a compressed air supply source, and inflow and outflow passages 48, 50 for supplying, to the actuator 30, the compressed air obtained by controlling the compressed air supplied to the supply passage 46 on the basis of a control signal. Pressure gauges 52a to 52c are provided for the supply passage 46 and the inflow and outflow passages 48, 50 respectively. A cable connector 54, which is connected to the printed circuit board 14, is arranged on the casing 12.

Next, a block diagram for the positioner 10 will be explained with reference to FIG. 5. CPU 56, which functions as a calculating section, is provided on the printed circuit board 14 of the positioner 10. A control command signal as an input signal, which is outputted from a controller to the cable connector 54, is supplied to CPU 56. A nonvolatile memory 58 is connected to CPU 56. The output of CPU 56 is inputted into an electro-pneumatic converting section 60. The pressure of the compressed air, which is supplied from the compressed air supply source 62 via the supply passage 46 to the electro-pneumatic converting section 60, is converted into a pressure corresponding to an output signal from CPU 56, and it is supplied to the actuator 30 via the inflow and outflow passages 48, 50. The angle of rotation of the rotary shaft 32, which is obtained by converting, into the rotation, the displacement of the output shaft of the actuator 30 operated on the basis of the pressure described above, is converted into an electric signal by the position sensor 28. The electric signal is amplified by an operational amplifier 64. The signal is converted into a digital signal by an A/D converter 66 which comprises an analog multiplexer 68 on the input side, and the signal is inputted into CPU 56. The A/D converter 66 also converts the output signal of the temperature sensor 16 into a digital signal, and the signal is inputted into CPU 56.

CPU 56 functionally comprises a temperature compensation-calculating section 561 for compensating the temperature characteristic of the position sensor 28, and a linearity compensation-calculating section 562 for compensating the nonlinear output characteristic of the position sensor 28. CPU 56 controls the analog multiplexer 68 so that the output signal of the position sensor 28 amplified by the operational amplifier 64 is led to the A/D converter 66 to perform A/D conversion, and then the output signal of the temperature sensor 16 is led to the A/D converter 66 to perform A/D conversion. With reference to the data in the nonvolatile memory 58, the temperature compensation-calculating section 561 is used to perform temperature compensation for the output signal of the position sensor 28. With reference to the data in the nonvolatile memory 58, the nonlinear characteristic of the temperature-compensated output signal of the position sensor 28 is compensated to obtain the linear characteristic by using the linearity compensation-calculating section 562. Thus, the output signal of the position sensor 28 is obtained, for which the temperature has been compensated and the nonlinear output characteristic has been compensated.

The positioner 10 is constructed as described above. Next, explanation will be made for the compensating method for the positioner 10 according to the embodiment of the present invention.

A predetermined voltage is applied to the input terminals 45a, 45b of the position sensor 28 (see FIG. 4). It is assumed that when the rotary shaft 32 of the actuator 30 is at the reference position (provided that the angle of rotation in this state is 0°), the magnet 38 is disposed at a position of symmetry with respect to the MR elements 44a, 44b. In this state, the resistance value of the MR element 44a is equal to that of the MR element 44b. Accordingly, a voltage, which is ½ of the voltage applied to the input terminals 45a, 45b, is outputted to the output terminal 47.

When the rotary shaft 32 of the actuator 30 is rotated, the positional relationship of the magnet 38 with respect to the MR elements 44a, 44b is asymmetrical as shown in FIG. 4. In this state, the intensity of the magnetic field exerted on the MR elements 44a, 44b is changed, and the resistance value of each of the MR elements 44a, 44b is changed. Accordingly, the voltage at the output terminal 47 is changed.

The voltage at the output terminal 47 is amplified by the operational amplifier 64, and the voltage is inputted via the analog multiplexer 68 into the A/D converter 66, followed by being converted into a digital value by the A/D converter 66, and being detected as a position sensor output data $X_1$ by CPU 56. Similarly, the output of the temperature sensor 16 is inputted via the analog multiplexer 68 into the A/D converter 66, and it is converted into a digital value by the A/D converter 66, followed by being inputted into CPU 56. Thus, the temperature t is detected by CPU 56 on the basis of the output of the temperature sensor 16.

Figure 6:
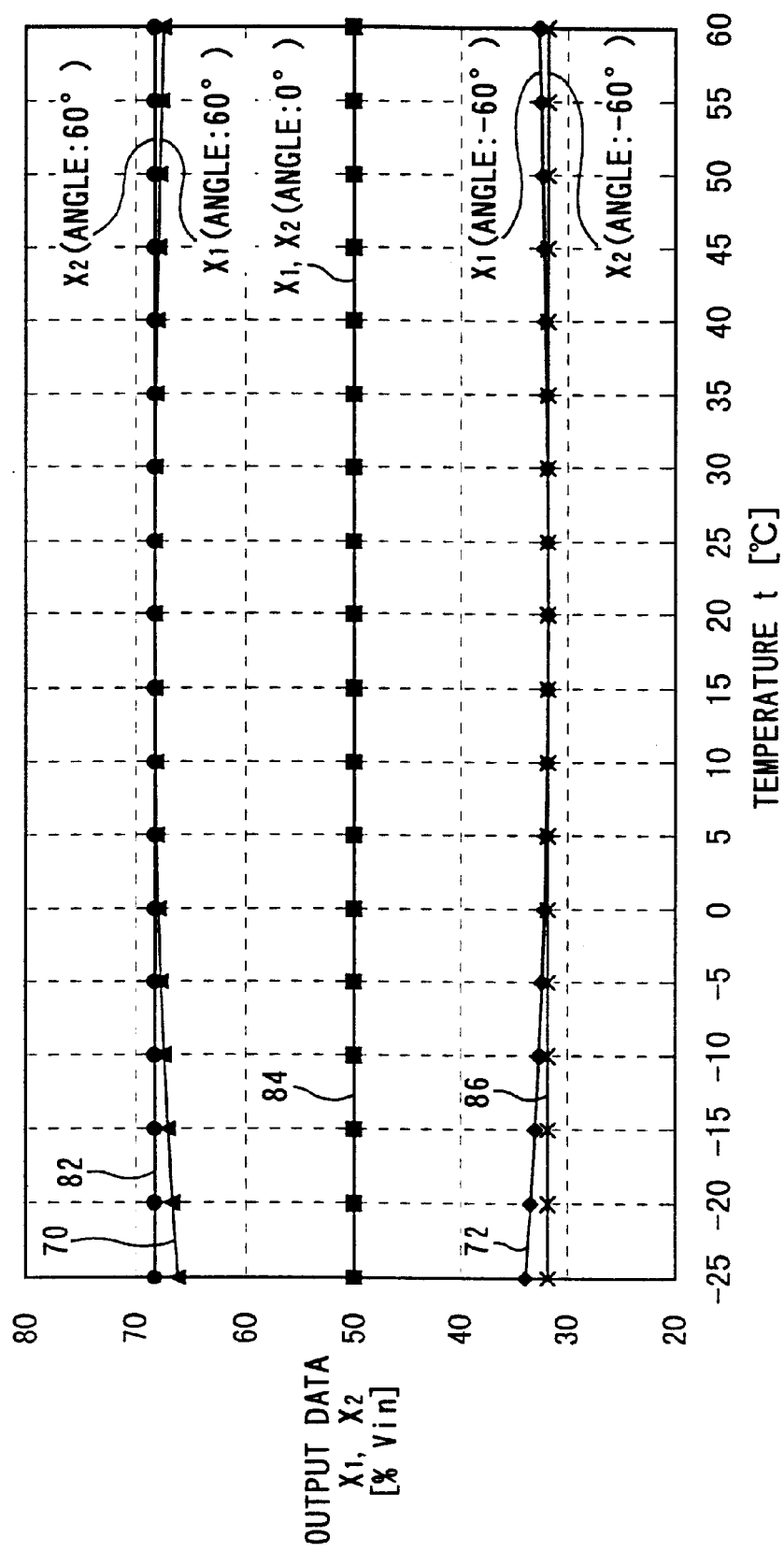
FIG. 6 shows a graph illustrating the relationship between the temperature of the position sensor and the output signal data and the temperature compensation output data.

It is noted that the position sensor output data $X_1$ is temperature-dependent as shown by curves 70, 72 depicted in FIG. 6. Further, as shown by a curve 74 depicted in FIG. 7, there is a nonlinear characteristic with respect to the angle of rotation. Therefore, the position sensor output data $X_1$ is subjected to the temperature compensation and the linearity compensation.

Figure 8:
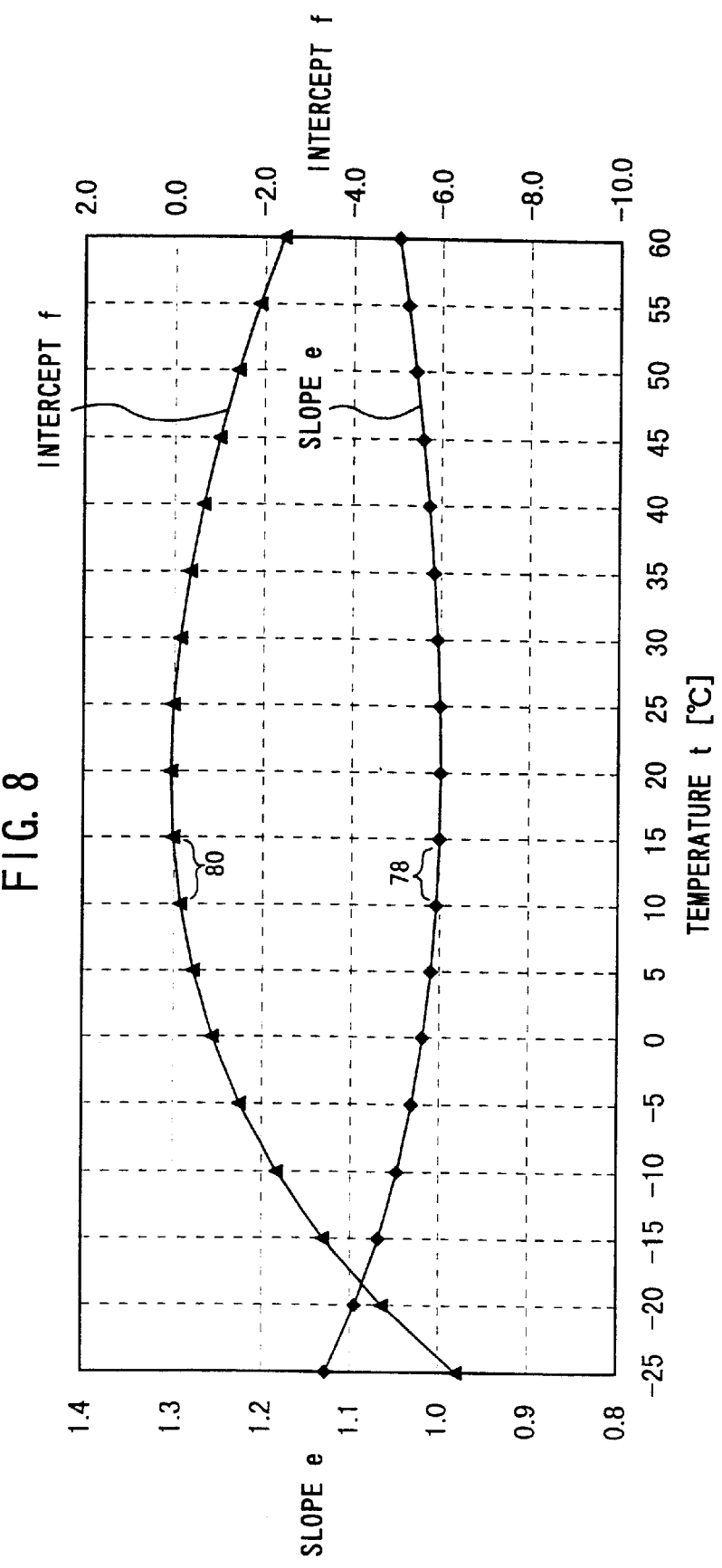
FIG. 8 shows a graph illustrating the relationship between the temperature of the position sensor and the slope and the intercept of the temperature compensation function.

At first, the slope e and the intercept f are determined, which are parameters of the temperature compensation function $J_1(X_1)$ approximated by a linear expression to give the position sensor output data $X_1$ at the reference temperature of 25°. As shown in Table 1 and FIG. 8, the slope e and the intercept f have been measured for each of the MR elements 44a, 44b, and they are stored in the nonvolatile memory 58. The slope e and the intercept f are determined for every predetermined temperature range by using the linear expression.

TABLE 1

| Temperature t [° C.] | Slope e | Intercept f |
|---|---|---|
| −25 | 1.1281 | −6.4114 |
| −20 | 1.0945 | −4.7267 |
| −15 | 1.0677 | −3.3863 |
| −10 | 1.0466 | −2.3279 |
| −5 | 1.0303 | −1.5091 |
| 0 | 1.0180 | −0.8939 |
| 5 | 1.0091 | −0.4512 |
| 10 | 1.0032 | −0.1584 |
| 15 | 1.0000 | 0.0030 |
| 20 | 0.9990 | 0.0514 |
| 25 | 1.0000 | 0.0000 |
| 30 | 1.0028 | −0.1424 |
| 35 | 1.0072 | −0.3627 |
| 40 | 1.0130 | −0.6566 |
| 45 | 1.0200 | −1.0125 |
| 50 | 1.0283 | −1.4295 |
| 55 | 1.0377 | −1.9013 |
| 60 | 1.0480 | −2.4232 |

For example, it is assumed that the temperature t is 12° C. On this condition, according to Table 1, the slope at t=10° C. is giving as follows.

$$e(10)=1.0032 \qquad \text{Expression (1)}$$

The slope at t=15° C. is given as follows.

$$e(15)=1.0000 \qquad \text{Expression (2)}$$

According to a straight line for connecting the foregoing slopes (reference numeral 78 in FIG. 8), the linear expression for the slope e is determined as follows.

$$e(t)=(e(15)-e(10))/(15-10)\times(t-10)+e(10)= \\ -0.00064t+1.0096 \qquad \text{Expression (3)}$$

If Expression (3) is substituted with the temperature t=12° C., the slope on this condition is determined as follows.

$$e(12)=1.00192 \qquad \text{Expression (4)}$$

The intercept f is determined similarly as follows.

That is, according to Table 1, the intercept at t=10° C. is given as follows.

$$f(10)=-0.1584 \qquad \text{Expression (5)}$$

The intercept at t=15° C. is given as follows.

$$f(15)=0.0030 \qquad \text{Expression (6)}$$

According to a straight line for connecting the foregoing intercepts (reference numeral 80 in FIG. 8), the linear expression for the intercept f is determined as follows.

$$f(t)=(f(15)-f(10))/(15-10)\times(t-10)+f(10)= \\ 0.03228t-0.4812 \qquad \text{Expression (7)}$$

If Expression (7) is substituted with the temperature t=12° C., the intercept is determined as follows.

$$f(12)=-0.09384 \qquad \text{Expression (8)}$$

The slope e and the intercept f thus determined are used as the parameters of the temperature compensation function $J_1(X_1)$ to the temperature compensation output data $X_2$. That is, the following expression is obtained.

$$X_2=J_1(X_1)=e(t)\times X_1+f(t)=1.00192\times X_1-0.09384 \qquad \text{Expression (9)}$$

At this stage, the temperature compensation output data $X_2$ has been subjected to the temperature compensation on the basis of the reference temperature of 25° C. as shown by the straight lines 82, 84, 86 depicted in FIG. 6. However, the linearity is not compensated.

Figure 9:
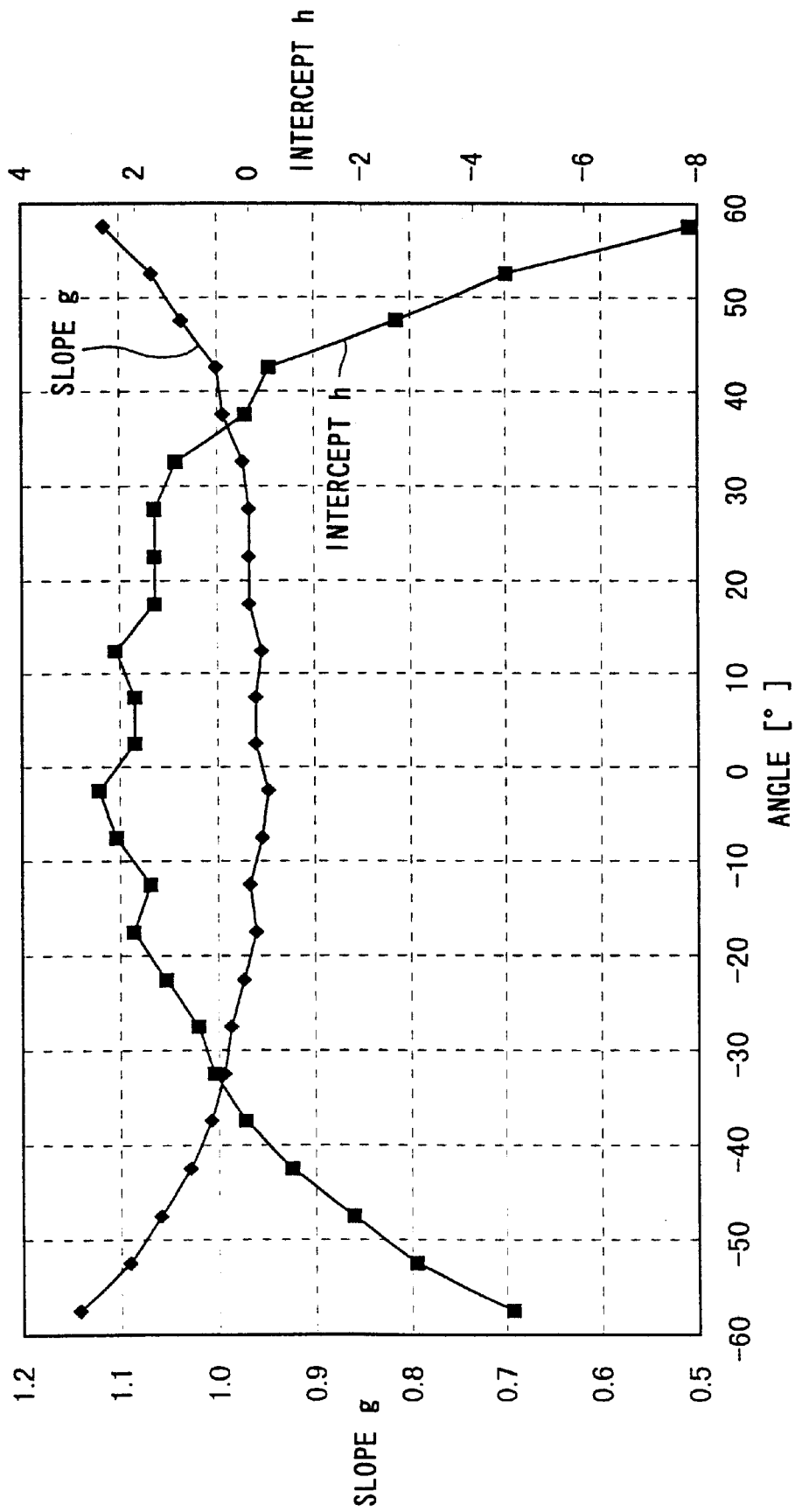
FIG. 9 shows a graph illustrating the relationship between the angle of the position sensor and the slope and the intercept of the linearity compensation function.

Accordingly, the temperature compensation output data $X_2$ is then subjected to the linearity compensation. In this procedure, at first, the slope g and the intercept h are determined, which are parameters of the linearity compensation function $J_2(X_2)$ approximated by a linear expression. As shown in Table 2 and FIG. 9, the slope g and the intercept h have been measured for each of the MR elements 44a, 44b, and they are stored in the nonvolatile memory 58. The slope g and the intercept h are determined for every predetermined temperature compensation output data $X_2$ by using the linear expression.

TABLE 2

| Angle [°] | Temperature compensation output data $X_2$ [% Vin] | Slope g | Intercept h |
|---|---|---|---|
| −60 to −55 | 32.73 to 34.00 | 1.14173 | −4.70890 |
| −55 to −50 | 34.00 to 35.33 | 1.09023 | −2.95767 |
| −50 to −45 | 35.33 to 36.70 | 1.05839 | −1.83307 |
| −45 to −40 | 36.70 to 38.11 | 1.02837 | −0.73113 |
| −40 to −35 | 38.11 to 39.55 | 1.00694 | 0.08535 |
| −35 to −30 | 39.55 to 41.01 | 0.99315 | 0.63089 |
| −30 to −25 | 41.01 to 42.47 | 0.98630 | 0.91178 |
| −25 to −20 | 42.47 to 43.96 | 0.97315 | 1.47013 |
| −20 to −15 | 43.96 to 45.47 | 0.96026 | 2.03675 |
| −15 to −10 | 45.47 to 46.97 | 0.96667 | 1.74567 |
| −10 to −5 | 46.97 to 48.49 | 0.95395 | 2.34309 |
| −5 to 0 | 48.49 to 50.02 | 0.94771 | 2.64542 |
| 0 to 5 | 50.02 to 51.53 | 0.96026 | 2.01755 |
| 5 to 10 | 51.53 to 53.04 | 0.96026 | 2.01755 |
| 10 to 15 | 53.04 to 54.56 | 0.95395 | 2.35263 |
| 15 to 20 | 54.56 to 56.06 | 0.96667 | 1.65867 |
| 20 to 25 | 56.06 to 57.56 | 0.96667 | 1.65867 |
| 25 to 30 | 57.56 to 59.06 | 0.96667 | 1.65867 |
| 30 to 35 | 59.06 to 60.54 | 0.97297 | 1.28622 |
| 35 to 40 | 60.54 to 62.00 | 0.99315 | 0.06466 |
| 40 to 45 | 62.00 to 63.45 | 1.00000 | −0.36000 |
| 45 to 50 | 63.45 to 64.85 | 1.03571 | −2.62607 |
| 50 to 55 | 64.85 to 66.21 | 1.06618 | −4.60154 |
| 55 to 60 | 66.21 to 67.51 | 1.11538 | −7.85962 |

For example, it is assumed that there are given the temperature t=12° C. and the position sensor output data $X_1$=60 [% Vin]. On this condition, Expression (9) is substituted therewith as follows.

$$X_2 = J_1(60) \qquad \text{Expression (10)}$$
$$= 1.00192 \times 60 - 0.09384$$
$$= 60.02136$$

Accordingly, the temperature compensation output data $X_2$ is used with reference to Table 2 to obtain the slope g=0.97297 and the intercept h=1.28622. The linearity compensation function $J_2(X_2)$ is substituted with the slope g and the intercept h to obtain the linearity compensation output data $X_3$. That is, the following expression is obtained.

$$X_3 = J_2(X_2) \qquad \text{Expression (11)}$$
$$= g \times X_2 + h$$
$$= 0.97297 \times X_2 + 1.28622$$

When Expression (11) is substituted with the temperature compensation output data $X_2$=60.02136 determined with Expression (10), the following value is determined.

$$X_3=J_2(60)=59.6851820264$$

Figure 7:
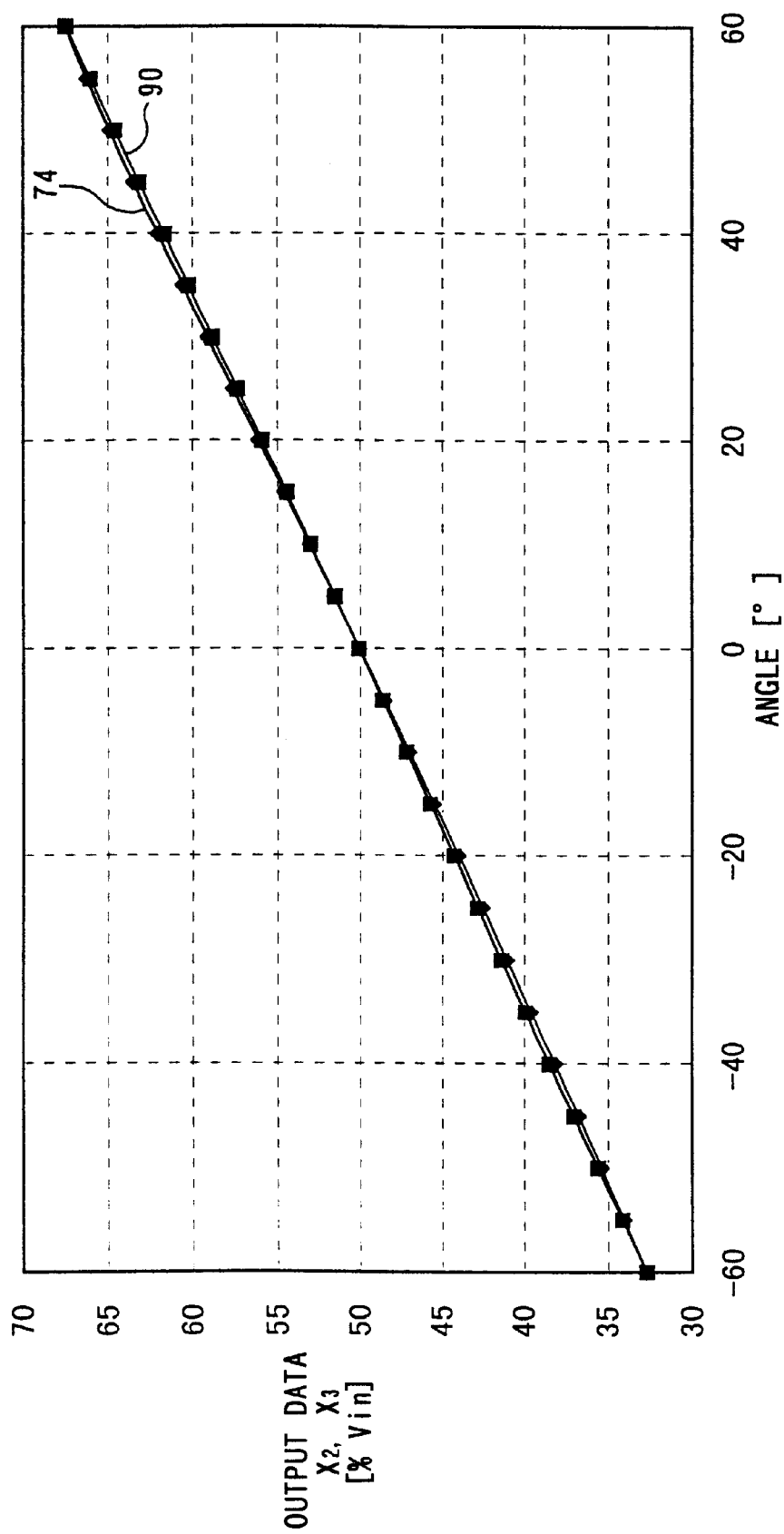
FIG. 7 shows a graph illustrating the relationship between the angle of the position sensor and the temperature compensation output data and the linearity compensation output data.

The linearity compensation output data $X_3$ thus obtained makes linear change with respect to the angle of rotation as shown by a straight line 90 depicted in FIG. 7.

The temperature compensation is performed as described above, and then the linearity compensation is performed. The data, which has been subjected to the linearity compensation, is referred to as the linearity compensation output data $X_3$.

Further, CPU 56 calculates the difference between the linearity compensation output data $X_3$ and the target value data inputted through the cable connector 54. The deviation is subjected to the arithmetic operation such as PID control to give the control output to the electro-pneumatic converting section 60. The electro-pneumatic converting section 60 is operated such that the compressed air supplied from the compressed air supply source 62 is introduced into the actuator 30 corresponding to the control output, or the compressed air is discharged from the actuator 30 correspondingly thereto. Accordingly, the actuator 30 is operated, and the rotary shaft 32 is rotated to make coincidence with the target value data.

The position sensor 28 measures the angle of rotation of the rotary shaft 32 again, and the temperature compensation and the linearity compensation are applied thereto as described above to perform the control.

According to the compensating method and the compensating apparatus for the positioner concerning the present invention, the following effects and advantages are obtained.

Since the temperature compensation and the linearity compensation are applied to the output of the position sensor by means of the arithmetic operation, it is unnecessary to provide any temperature-compensating circuit and any linearity-compensating circuit. Thus, it is possible to reduce the production cost of the positioner. Further, since the accuracy of the output data of the position sensor is improved, it is possible to make highly accurate control by using the positioner.

What is claimed is:

1. A compensating method for a positioner, comprising the steps of:

detecting a displacement amount of a movable section of an objective control device operated on the basis of a control signal outputted from said positioner by using a position sensor to obtain a position sensor output data;

detecting a temperature of said positioner by using a temperature sensor;

performing temperature compensation for said position sensor output data by using a function determined corresponding to said temperature detected by said temperature sensor to obtain a temperature-compensated output data; and compensating nonlinearity of said temperature-compensated output data by using a function determined corresponding to said temperature-compensated output data to obtain an output data for which said nonlinearity has been compensated.

2. The compensating method for said positioner according to claim 1, wherein said function determined corresponding to said temperature is given by a linear expression of said position sensor output data, and a slope and an intercept of a straight line formed by said linear expression are set corresponding to said temperature.

3. The compensating method for said positioner according to claim 1, wherein said function determined corresponding to said temperature-compensated output data is given by a linear expression of said position sensor output data, and a slope and an intercept of a straight line formed by said linear expression are set corresponding to said temperature-compensated output data.

4. A compensating apparatus for a positioner, comprising:

a position sensor for detecting a displacement amount of a movable section of an objective control device operated on the basis of a control signal outputted from said positioner;

a temperature sensor for detecting a temperature of said positioner;

a temperature compensation-calculating means for performing temperature compensation for an output data obtained by said position sensor by using a function determined corresponding to said temperature detected by said temperature sensor to obtain a temperature-compensated output data; and a linearity compensation-calculating means for compensating nonlinearity of said temperature-compensated output data by using a function determined corresponding to said temperature-compensated output data determined by said temperature compensation-calculating means to obtain an output data for which said nonlinearity has been compensated.

5. The compensating apparatus for said positioner according to claim 4, wherein said position sensor comprises first and second magneto resistive effective elements connected in series, and a magnet which is movable while opposing to said first and/or second magneto resistive effective element on the basis of displacement of said movable section, and an output is obtained from a common point of connection of said first magneto resistive effective element and said second magneto resistive effective element.

6. The compensating apparatus for said positioner according to claim 4, wherein said temperature compensation-calculating means comprises:

a storage means for previously storing a temperature-compensating function determined corresponding to said temperature, as a linear expression of said position sensor output data, concerning a slope and an intercept of a straight line formed by said linear expression with respect to said temperature; and a temperature compensation-calculating section for reading said slope and said intercept stored in said storage means with reference to said temperature detected by said temperature sensor, and determining said temperature-compensated output data on the basis of said slope and said intercept having been read.

7. The compensating apparatus for said positioner according to claim 4, wherein said linearity compensation-calculating means comprises:

a storage means for previously storing a linearity-compensating function determined corresponding to said temperature-compensated output data, as a linear expression of said temperature-compensated output data, concerning a slope and an intercept of a straight line formed by said linear expression with respect to said position sensor output data outputted from said position sensor and said temperature-compensated output data; and a linearity compensation-calculating section for reading said slope and said intercept stored in said storage means with reference to said position sensor output data outputted from said position sensor and said temperature-compensated output data, and determining said output data for which said nonlinearity of said position sensor has been compensated, on the basis of said slope and said intercept having been read.

* * * * *